(12) United States Patent
Dearing (10) Patent No.: US 11,803,806 B2
(45) Date of Patent: Oct. 31, 2023

(54) INTELLIGENT DYNAMIC ROUTING AND DELIVERY SYSTEMS

(71) Applicant: United States Postal Service, Washington, DC (US)

(72) Inventor: Stephen M. Dearing, Herndon, VA (US)

(73) Assignee: United States Postal Service, Washington, DC (US)

( * ) Notice: Subject to any disclaimer, the term of this patent is extended or adjusted under 35 U.S.C. 154(b) by 636 days.

(21) Appl. No.: 16/385,586

(22) Filed: Apr. 16, 2019

(65) Prior Publication Data

US 2019/0325389 A1    Oct. 24, 2019

Related U.S. Application Data

(60) Provisional application No. 62/659,455, filed on Apr. 18, 2018.

(51) Int. Cl.
| | |
|---|---|
| *G06Q 10/0835* | (2023.01) |
| *G06Q 10/047* | (2023.01) |
| *G06F 3/0482* | (2013.01) |
| *G06Q 10/0833* | (2023.01) |
| *G06F 9/54* | (2006.01) |
| *G06F 16/29* | (2019.01) |

(52) U.S. Cl.
CPC ..... *G06Q 10/08355* (2013.01); *G06F 3/0482* (2013.01); *G06F 9/542* (2013.01); *G06F 16/29* (2019.01); *G06Q 10/047* (2013.01); *G06Q 10/0833* (2013.01)

(58) Field of Classification Search
CPC ............... G06Q 10/083; G06Q 10/832; G06Q 10/0833; G06Q 10/0835; G06Q 10/0837; G06Q 10/0838
See application file for complete search history.

(56) References Cited

U.S. PATENT DOCUMENTS

| | | | |
|---|---|---|---|
| 8,504,485 | B1 | 8/2013 | Wenneman et al. |
| 10,977,751 | B1 * | 4/2021 | Bernstein ........... G06Q 10/0832 |
| 2004/0049404 | A1 | 3/2004 | Murphy |
| 2007/0038506 | A1 | 2/2007 | Noble et al. |
| 2007/0150375 | A1 | 6/2007 | Yang |
| 2009/0076933 | A1 | 3/2009 | Park et al. |

(Continued)

OTHER PUBLICATIONS

Ranieri, Luigi, et al. "A review of last mile logistics innovations in an externalities cost reduction vision." Sustainability 10.3 (2018): 782. (Year: 2018).*

(Continued)

*Primary Examiner* — Emmett K. Walsh
(74) *Attorney, Agent, or Firm* — Morgan, Lewis & Bockius LLP (57) ABSTRACT

Systems and methods for dynamic routing of delivery resources for delivery of items from a pickup location on or near a first planned route to a delivery location on or near a second planned route. Methods can include identifying a first route and a second route based on the pickup and delivery locations, selecting one of a predetermined plurality of transfer nodes based on the locations of the first and second routes, and sending instructions to resources traveling along the first and second routes to meet and transfer the items at the selected transfer node.

20 Claims, 4 Drawing Sheets

(56) References Cited

U.S. PATENT DOCUMENTS

| | | | |
|---|---|---|---|
| 2012/0030133 A1* | 2/2012 | Rademaker | G06Q 10/08 705/333 |
| 2012/0173448 A1* | 7/2012 | Rademaker | G06Q 50/28 705/338 |
| 2014/0258167 A1* | 9/2014 | Rohmann | G06Q 10/083 705/335 |
| 2014/0317005 A1* | 10/2014 | Balwani | G06Q 10/0832 705/317 |
| 2014/0330739 A1* | 11/2014 | Falcone | G06Q 10/08355 705/338 |
| 2015/0324945 A1 | 11/2015 | Lord et al. | |
| 2015/0370251 A1 | 12/2015 | Siegel et al. | |
| 2015/0379468 A1 | 12/2015 | Harvey | |
| 2016/0071056 A1 | 3/2016 | Ellison et al. | |
| 2016/0163204 A1 | 6/2016 | Raptopoulos et al. | |
| 2016/0247113 A1 | 8/2016 | Rademaker | |
| 2017/0091710 A1 | 3/2017 | Van Dyke | |
| 2017/0169535 A1 | 6/2017 | Tolkin et al. | |
| 2017/0316376 A1 | 11/2017 | Cooper | |
| 2017/0330144 A1 | 11/2017 | Wakim et al. | |
| 2018/0096300 A1 | 4/2018 | Boye et al. | |
| 2018/0174093 A1* | 6/2018 | Perez | G06Q 10/083 |
| 2018/0188731 A1 | 7/2018 | Matthiesen et al. | |
| 2018/0315146 A1 | 11/2018 | Matthiesen et al. | |
| 2018/0356239 A1 | 12/2018 | Marco | |

OTHER PUBLICATIONS

International Search Report and Written Opinion dated Jun. 27, 2019 in International Application No. PCT/US2019/027699.

* cited by examiner

INTELLIGENT DYNAMIC ROUTING AND DELIVERY SYSTEMS

CROSS-REFERENCE TO RELATED APPLICATIONS

This application claims the benefit of U.S. Provisional Application Ser. No. 62/659,455, filed Apr. 18, 2018, entitled "INTELLIGENT DYNAMIC ROUTING AND DELIVERY SYSTEMS," which is hereby incorporated by reference in its entirety and for all purposes.

FIELD

This disclosure relates to systems and methods for dynamically routing and delivering items within a common geographic area.

BACKGROUND

Distribution networks may be optimized for long-distance transport of items, such as between different cities, counties, states, or countries. Optimal features for long-distance transport of items may include a hierarchical structure in which local resources pick up and deliver items between delivery points and unit delivery facilities. Unit delivery facilities may distribute items to resources for delivery, and/or may send items to other unit delivery facilities, or to distribution centers and/or hubs to be sent to other unit delivery facilities. While such organizational structures may optimize long-distance transport, they may be inefficient for pickup and delivery of items across short distances, such as within a common geographical area such as a town, city, county, or the like.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

Various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

In one aspect described herein, a system for dynamically routing delivery resources comprises a processor configured to receive item delivery requests, each item delivery request comprising a pickup location, a delivery location, and item information corresponding to an item to be delivered; a dynamic router processor in communication with a memory storing a plurality of predetermined resource routes traveled by a plurality of resources and a plurality of predetermined transfer nodes. The dynamic router processor is configured to, for individual item delivery requests, determine, from the plurality of predetermined resource routes, a first resource route that passes within a first threshold distance relative to the pickup location; determine, from the plurality of predetermined resource routes, a second resource route that passes within the first threshold distance relative to the delivery location; select, from the plurality of predetermined transfer nodes, a transfer node disposed within a second threshold distance relative to at least a portion of the first resource route and at least a portion of the second resource route; and send dynamic route information to the processor, the dynamic route information identifying at least the first resource route, the second resource route, and the transfer node. The processor is further configured to cause a display of a first mobile device to display an item pickup instruction and a first item transfer instruction to a first resource located along the first resource route; and cause a display of a second mobile device to display a second item transfer instruction and an item delivery instruction to a second resource located along the second resource route.

In some embodiments, the dynamic router processor is further configured to receive real time or near-real time location information corresponding to individual resources located along the predetermined resource routes. In some embodiments, the dynamic router selects the transfer node based at least in part on the location information. In some embodiments, the first item transfer instruction and the second item transfer instruction each include at least one of an identifier of the selected transfer node or directions to the selected transfer node. In some embodiments, the one or more item pickup instructions comprise at least one of an identifier of the pickup location or directions to the pickup location. In some embodiments, the item delivery instructions comprise at least one of an identifier of the delivery location or directions to the delivery location. In some embodiments, at least one of the first item transfer instruction or the second item transfer instruction comprises an instruction to deviate from and subsequently return to the first resource route or the second resource route. In some embodiments, the dynamic router is further configured to add, modify, and remove individual nodes of the predetermined transfer nodes stored in the memory, based at least in part on aggregated resource location data associated with the plurality of predetermined resource routes. In some embodiments, the processor is further configured to cause the first mobile device to provide, to the first resource, a visual or audio alert when the item pickup instruction is displayed; and cause the second mobile device to provide, to the second resource, a visual or audio alert when the second item transfer instruction is displayed. In some embodiments, the selected transfer node is located on at least one of the first resource route or the second resource route. In some embodiments, the first item transfer instruction comprises identification information associated with the second resource, and the second item transfer instruction comprises identification information associated with the first resource.

In another aspect described herein, a method for dynamically routing delivery resources comprises receiving, at a computing resource of a distribution network, a request for delivery of an item from a pickup location to a delivery location; determining, from a plurality of predetermined resource routes, a first resource route that passes within a first threshold distance relative to the pickup location; determining, from the plurality of predetermined resource routes, a second resource route that passes within the first threshold distance relative to the delivery location; selecting, from a plurality of predetermined transfer nodes, a transfer node located such that the first resource route and the second resource route each pass within a second threshold distance relative to the selected transfer node; sending, to a first mobile delivery device associated with a first resource traveling along the first resource route, a first set of instructions that cause the first resource to retrieve the item at the pickup location and transport the item to the selected transfer node; and sending, to a second mobile delivery device associated with a second resource traveling along the second resource route, a second set of instructions that cause the second resource to retrieve the item from the first resource at the selected transfer node and transport the item to the delivery location.

In some embodiments, the request comprises item information identifying the item, and wherein the first set of instructions comprises the item information. In some embodiments, the transfer node is selected based at least in part on real time or near-real time location information corresponding to the first resource and the second resource. In some embodiments, the transfer node is selected such that the first resource and the second resource can arrive at the transfer node within a predetermined time period. In some embodiments, the transfer node is selected based at least in part on a temporary parking location of a vehicle associated with the first resource or the second resource. In some embodiments, the first set of instructions comprises an instruction to deposit the item within the vehicle, or the second set of instructions comprises an instruction to retrieve the item from the vehicle. In some embodiments, the first set of instructions comprises identification information associated with the second resource, and the second set of instructions comprises identification information associated with the first resource. In some embodiments, at least one of the first set of instructions or the second set of instructions comprises an instruction to deviate from and return to the first resource route or the second resource route. In some embodiments, the method further comprises receiving a subsequent request for delivery of a second item from a second pickup location to a second delivery location within a requested time period; determining that the delivery of the second item cannot be performed within the requested time period, based at least in part on the second pickup location, the second delivery location, and real time or near-real time location information corresponding to one or more resources; and sending, to a user interface associated with the subsequent request, a notification that the delivery of the second item cannot be performed within the requested time period.

DETAILED DESCRIPTION

The features, aspects and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The systems and methods described herein relate to coordinating pick-up of items from a variety of sources, including vendors, merchants, and other retailers, including online retailers. The systems and methods described herein also relate to coordinating the delivery of the picked up items within a specific geographical area, such as a metropolitan area, a city, or a neighborhood. In some embodiments, the system of pick-up and delivery is related to pick-up and delivery of items within a specified or predetermined time, such as pick-up and delivery on the same day, next-day delivery, or other specified time period. A customer may also wish to order an item for pickup and delivery within a common geographic area, and may include preferences for the pickup and delivery locations and times.

In some embodiments, the systems and methods described herein may comprise a merchant, retailer, vendor, or other commercial party which orders an item and wishes the item to be delivered to another commercial location or party within the same day or other specified time period.

As used herein, unless otherwise indicated, resource may refer to a carrier, a vehicle, or other persons or objects capable of picking up, containing, and/or delivering items, such as postal carriers and postal vehicles.

In some embodiments, the system and method described herein provides real-time tracking of an item and the item's pick-up and delivery status throughout the pick-up and delivery cycle, via a user interface. In some embodiments, the system and method described herein provide faster delivery by optimizing routes to maximize pick-up and delivery efficiency, while reducing pick-up and delivery time and costs.

In order to provide dynamic routing which optimizes or increases the efficiency of a distribution network, to improve timeliness and to meet customer expectations or demands, the distribution network and dynamic routing systems can take into account various factors. For example, the dynamic routing systems can take into account weather conditions, traffic conditions, resource location, resource type, GPS breadcrumb data, and other conditions to prepare dynamic routing instructions for the resources, such as carriers, vehicles, and the like.

By using location breadcrumb information, obtained from GPS-enabled transportation (e.g. bikes, cars, trucks, vans, trains, planes, drones, etc.) and/or GPS-enabled handheld devices (e.g. mobile phones, tablets, laptops, GPS-enabled fleet devices, mobile delivery devices (MDD's), etc.), to dynamically determine optimal pickup and delivery routes and intelligently dispatch carriers and transportation vehicles based on optimal scenarios, e.g. the systems and methods of the current system are continuously aware of fleet vehicle and carrier locations and uses the location information along with other pertinent information (e.g. weather and traffic conditions, transit time, pickup and destination information, item details, etc.) to intelligently determine an optimal combination of route, carrier, and transportation type that would fulfill a pickup and delivery service request.

Information used as a basis for systems and methods of the present disclosure include but are not limited to: pickup and destination information, local/while in-transit/destination weather condition information, local/while in-transit/destination traffic condition information, transportation schedules (e.g. estimated arrival, transit, and departure date/times) and GPS location breadcrumb information (e.g. where in the delivery route is the vehicle), carrier GPS location breadcrumb information (e.g. where in the delivery route are the carriers), carrier route information (e.g. what is the current route for the carrier, considering any recently system-added pickup/delivery points), information pertinent to the item requiring transport (e.g. the item's type, size, quantity, weight, and if applicable, special handling instructions, and pickup and delivery addresses), customer/mailer information (e.g. a unique ID associated with the mailer/customer/point of contact, contact information and payment information).

In some embodiments, the system and method of coordinating pick-up and delivery provides a convenient way to order items and have them delivered within a specified time frame. For example, a user may live in a metropolitan area, and may not have easy access to an automobile. The user may want to purchase an item from a vendor, merchant, or retailer, but may not want or be able to transport the item on public transportation or may not want or be able to carry the item home. The system and method described herein provide a way for such a user to purchase items and have them delivered to the user's home. For example, a user may be physically present at a store or other merchant or retailer, and purchase an item which the user cannot, or does not wish to transport him or herself. The user may request pick-up and delivery using the system and method described herein. The user may then expect delivery of the item to the user's home within a specified time period, such as within the same day as the purchase. In some embodiments, the system and method described herein comprise providing an on-line purchasing system wherein users who purchase an item online can request delivery, using the system and method of the present application, within a specified time period, such as within the same day.

In some embodiments, the customer can request a pick-up or delivery at locations other than the customer's home or mailbox, or can request pick-up and/or delivery at times that are most convenient for the customer, shipper, or merchant. As an example, the United States Postal Service (USPS) could provide customers with service offerings that would allow customers to specify a different pickup/delivery date/time and/or alternate nearby delivery location (e.g. carrier scheduled to drop off a delivery at customer's preferred pickup location) or delivery by carrier to a customers secured mail/parcel receptacle. With this type of offering, the system's intelligence would be used to determine a nearby alternate pickup and delivery location, transportation type, and pricing, based on the actual effort (e.g. effort could be based on the number of miles driven, the transit time/duration, the delivery service type (e.g., same day, next day, etc.), or special delivery location such as a secure receptacle (e.g. including but not limited to a drop box or secure mail receptacle provided by either the Postal Service or the customer).

Customers, retailers, merchants, e-commerce vendors, and others can use an interface, such as a website or mobile phone application to schedule pick-up, delivery, local delivery requests, courier requests, and other similar services. The interface can communicate with various systems and devices within the distribution network and external to the distribution network.

Figure 1:
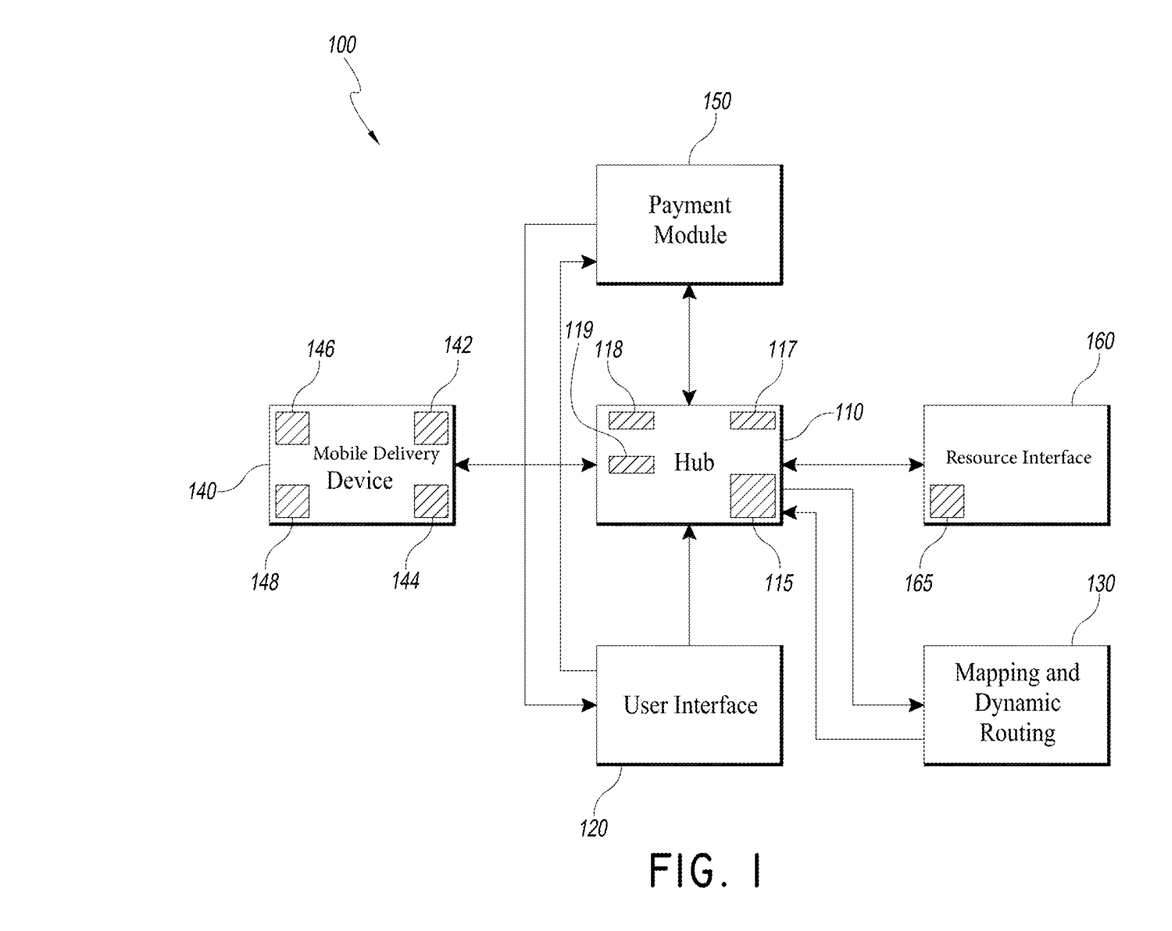
FIG. 1 is a block diagram depicting an embodiment of a system for coordinating pick-up and delivery of items.

FIG. 1 depicts an embodiment of a system 100 for dynamic routing for pick-up and delivery of items. The system 100 comprises a control hub 110, a user interface 120, a dynamic router 130, a mobile delivery device 140, a payment module 150, and a resource interface 160. The control hub 110 is in communication, either wired or wirelessly, with at least the user interface 120, the dynamic router 130, the mobile delivery device 140, the payment module 150, and the resource interface 160. The resource interface 160 can comprise a memory 165 configured to store resource information received in the resource interface 160. It will be understood that embodiments of the present disclosure may be implemented with a plurality of mobile delivery devices 140, for example, as carried by a plurality of delivery resources.

The control hub 110 may comprise or be a component of a processing system implemented with one or more processors. The control hub 110 may be a network of interconnected processors housed on one or more terminals. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The control hub may comprise a processor 118 such as, for example, a microprocessor, such as a Pentium® processor, a Pentium® Pro processor, a 8051 processor, a MIPS® processor, a Power PC® processor, an Alpha® processor, a microcontroller, or the like. The processor 118 typically has conventional address lines, conventional data lines, and one or more conventional control lines. The processor 118 may be in communication with a memory 119, which may include, for example, RAM memory, flash memory, ROM memory, EPROM memory, EEPROM memory, registers, hard disk, a removable disk, a CD-ROM, or any other form of storage medium known in the art. The memory may include, for example, software, at least one software module, instructions, steps of an algorithm, or any other information. In some embodiments, the processor 118 performs processes in accordance with instruction stored in the memory 119. These processes may include, for example, controlling features and/or components of the system 100, and controlling access to and from, and transmitting information and data to and from the control hub 110 and the constituent components of the system 100, as will be described herein.

The control hub 110 comprises a hub memory 115, configured to store item information, such as pick-up information, delivery information, user information, specific pick-up instructions, specific delivery instructions, and payment information. The hub memory 115 may comprise a database, a comma delimited file, a text file, or the like. The control hub 110 generates a unique identifier and/or creates a unique record for each item upon receipt of any item information regarding the purchase of an item, pick-up of an item, delivery preferences, etc., which may include the information described above. The control hub 110 is configured to associate the item information stored in the hub memory 115 for each item, with the unique identifier for each item, and to store the association in the hub memory 115. The control hub 110 is configured to coordinate and direct the activities of the components of system 100, and to coordinate providing user access to pick-up and delivery information for an item being picked-up or delivered via the system 100. In some embodiments, the control hub 110 is configured to assign a unique identifier and/or create a unique record for a request for concierge services, or other services provided via the distribution network.

In some embodiments, the processor 118 is connected to a communication feature 117. The communication feature 117 is configured for wired, and/or wireless communication. In some embodiments, the communication feature 117 communicates via telephone, cable, fiber-optic, or any other wired communication network. In some embodiments, the communication feature 117 may communicate via cellular networks, WLAN networks, or any other wireless network. The communication feature 117 is configured to receive instructions and to transmit and receive information among components of the system 100, and in some embodiments, with a central server (not shown) or other resource outside system 100, as desired.

In some embodiments, the control hub is in communication with the user interface 120. The user interface 120 is configured to provide user access to the pick-up and delivery system. The user interface 120 may be provided over a website or internet portal accessible from an internet-enabled computer or mobile computing device. The user interface 120 can be provided as an application configured for use on a smart phone.

The user interface 120 provides a user with options to request a pick-up, view requested pick-ups, request delivery, order an item or product, request a concierge service, or any other desired functionality. The user interface 120 may be customizable for a particular user, such as a retailer, a consumer, customer, merchant, e-commerce vendor, and the like. In some embodiments, using the user interface 120, a user may input an order into the system 100. The order may comprise the purchase of an item and scheduling a pick-up or designation of the item for delivery using the system 100. For example, a user may order an item at a store, a vendor, merchant or other retail location. At the location, a user, which may be the merchant, vendor, or retailer, or, in some embodiments, the purchaser, inputs the item information, including, for example, pick-up location, delivery location, and any specific pick-up or delivery instructions. In some embodiments, the customer inputs information into the user interface 120 including an order, and the control hub 110 communicates the information to a merchant, retailer, etc. regarding the order. The control hub 110 can also send the merchant, retailer, etc., information regarding the order form the user, including a pick-up time determined by the system, delivery information, etc. In some embodiments, the merchant, retailer, vendor, can provide order information to the control hub 110, and the control hub 110 can initiate communication with the user via the user interface 120 to schedule a pick-up and/or delivery time and location. The item information is then transmitted to the control hub 110. In some embodiments, the user interface at a particular location may require a log-in identity to access the system 100. This log-in identity may be transmitted to the control hub 110 and may automatically identify the pick-up location, without the need for user input of the pick-up location.

The user interface 120 may be configured to provide payment information to a payment module 150. This information may include whether a fee or payment, such as postage, for pick-up and/or delivery of the item has been paid. For example, in some embodiments, a user may pay for pick-up or delivery, by paying a fee or buying postage, at the time of purchase of the item, either in a store or retailer, or on-line. In some embodiments, a user may indicate that the fee or the postage, is payable upon delivery. In some embodiments, a user may indicate whether insurance on the item is desired, and may purchase insurance via the user interface 120.

The user interface 120 may comprise other capabilities, which will be described in greater detail below.

Upon receiving the item information from the user interface 120, the control hub 110 stores the item information in the hub memory 115. The control hub 110 also generates a unique identifier for the item. The unique identifier may be an alphanumeric string, a computer readable code such as, for example, a barcode, a 1-D barcode, a 2-D barcode, a QR-code, an RFID tag, or any other desired computer readable code, a biometric identification feature, a color pattern, and image, or any other visual identifier. The control hub 110 associates the item information stored in hub memory 115 with the unique identifier, and stores the association in the hub memory 115. In some embodiments, the association and/or the unique identifier may be stored in a database, or may be transmitted via wired or wireless communication to a central server (not shown) or may be transmitted to a cloud-based computer location.

The control hub 110 is in communication with the dynamic router 130. The dynamic router may comprise a processor, memory, databases, address and control lines, and other components similar to those described herein for the control hub 110. The control hub is configured to transmit at least a portion of the item information to the dynamic router 130. For example, the control hub 110 may transmit the pick-up location and the delivery location, pick-up time, delivery time, along with any specific routing instructions, to the dynamic router 130. The control hub 110 need not transmit all of the item information, such as some specific delivery instructions, the purchase price of the item, etc., to the dynamic router. In some embodiments, the control hub 110 does not transmit the unique identifier to the dynamic router 130.

The control hub 110 can also provide resource information received via the resource interface, including the locations of carriers, vehicles, traffic, weather, resource progress along delivery routes, GPS breadcrumb data, vehicle identity, vehicle inventory, and any other desired information, as will be described in greater detail.

The dynamic router 130 is configured to receive the item information, and resource information from the control hub 110. The dynamic router 130 is configured to generate an optimized route for pick-up, delivery, or both of a plurality of items. The dynamic router 130 may use a route optimization software model. In some embodiments, the dynamic router 130 is configured to optimize a pick-up or delivery route based on optimizing one or more variables, such as minimizing time and/or distance between item pick-ups or deliveries, overall distance traveled, reducing the number of left turns, or any other desired variable. The dynamic router 130 is further configured to generate routing instructions for each item, which have been optimized for one or more of the above variables, and group the individual items into one or more of the optimized routes. The dynamic router 130 is configured to generate a route identification number for each dynamically generated route, and associate each item with a route identification number. The dynamic router 130 can identify a resource nearest a pick-up location and a resource nearest a delivery location, and can determine a transfer location (e.g., from a list or database of predetermined transfer nodes) which is along or near to the planned routes for the resources identified, and can establish a transfer node, and can provide directions to the resources for getting to the transfer node, and for resuming their planned routes. The deviations from the planned routes and the returns to the planned routes can be part of the dynamic routes provided by the dynamic router 130. In some embodiments, the dynamic router can identify 1, 2, 3, or more resources and 1, 2, or more transfer points to effectuate item delivery.

The dynamic router 130 communicates the dynamic routes to the control hub 110, so they can be communicated to the resources, such as to the mobile delivery devices 140.

In some embodiments, the dynamic routing system may be configured to receive an input from the control hub 110 regarding time requirements or item-specific restrictions on the delivery of certain items. In some embodiments, the dynamic router is configured to take into account the resource availability or limits, special timing or other instructions while grouping items into routes. In some embodiments, the dynamic router 130 is configured to provide a notification if any specific time or other specific instructions cannot be carried out or met based on the available resources. In some embodiments, the dynamic router 130 is configured to request additional resources from the control hub 110, if needed.

In some embodiments, during or after purchasing an item, a customer, a vendor, retailer, merchant, or purchasing party may request and receive the unique identifier information for a particular item from the control hub 110 via the user interface 120. The customer, vendor, retailer, or merchant may print the unique identifier and affix it to the item to be picked-up. For example, when a customer purchases an item at a store, and elects, via the user interface 120, the pick-up and delivery of an item using system 100 the user interface 120 may prompt the customer, vendor, retailer, or merchant to select an option to print a label including a unique identifier. In this case, the user interface 120 requests the unique identifier and label information, such as delivery address and recipient from the item information stored in hub memory 115, and delivers a printable label to the customer, vendor, merchant, or retailer. Such a transaction may occur in a store, at a dedicated terminal, or it may occur at a customer's home, where the customer accesses the user interface 120 via the internet.

In some embodiments, the mobile delivery device 140 is a portable electronic device comprising a display 142, an input device 144, a scanner 146, and a global positioning system (GPS) unit 148. The mobile delivery device 140 is configured to wirelessly communicate with the control hub 110 via a cellular network, a wireless local area network (LAN), RF network, a near field network such as blue tooth, or a wireless protocol such as IEEE 802.11x. The mobile delivery device 140 is configured to communicate with the control hub 110 via a docking port or other similar wired connection. The mobile delivery device 140 can download route and/or item information while the mobile delivery device 140 is docked with the docking port. In some embodiments, the mobile delivery device 140 is a GPS enabled smartphone, tablet computer, personal digital assistant, or other similar portable communication device. The mobile delivery device 140 contains a program or instructions which provide an interface with the control hub 110 which enables a resource or carrier to receive and send instructions and other information to and from the control hub 110.

In some embodiments, The display 142 is configured to display the address or location, including, if desired, longitude and latitude, where an item is to be picked up and/or delivered. In some embodiments, the display 142 is further configured to provide navigation instructions, such as turn-by-turn route instructions, to guide the resource to each pick-up or delivery location. The turn-by-turn route instructions may comprise the routing instructions generated by the dynamic router 130. In some embodiments, the display 142 is further configured to provide one or more additional information items associated with an item pickup and/or delivery, such as timing information associated with a pickup, transfer, or delivery of the item, handling instructions, or the like.

In some embodiments, the input device 144 may be one or more of a keypad, a keyboard, a touch-screen, a mouse, a stylus, or other similar input device. The input device 144 provides a way for a resource to log-in to the system 100, access routing instructions stored at the control hub 110, and to transmit any desired information. In some embodiments, inputting resource log-in information or item information may be accomplished using the scanner 146. For example, a resource may use the scanner 146 to scan an identification code contained on an ID card or badge. The scanner 146 receives the scanned code and the mobile delivery device 140 is configured to transmit the identification information of the resource to the control hub 110. The scanned code identifies the resource to the control hub 110 and, if the scanned code is recognized, allows access to the system 100.

In some embodiments, the scanner 146 may be used to scan the unique identifier of each item, which may be located on the label provided by the control hub 110. In some embodiments, for example, the scanner 146 is configured to read the unique identifier on the label affixed to an item. The unique identifier may be encoded in a 1D or 2D barcode, a QR code, a RFID tag, an alphanumeric string, a visual or graphical identifier, or any other desired computer readable code, By scanning and reading the unique identifier, the mobile delivery device 140 may transmit information regarding pick-up or delivery status to the control hub 110.

In some embodiments, the handheld device comprises the GPS unit 148. The GPS unit 148 may provide an input to the navigation instructions by identifying the location of the resource, and using the resource location as an input to provide turn-by-turn navigation to the pick-up and/or delivery locations. In some embodiments, the mobile delivery device 140 is configured to transmit GPS position data of the resource to the control hub 110, which enables real-time tracking of the resource. The control hub 110 receives and stores the GPS coordinates. The control hub 110 may associate the GPS coordinates with a map to generate a map of the route the resource has taken, and to indicate the current position of the resource on the map.

The mobile delivery device 140 may be configured to receive an input relating to a location or route, such as a route identification number assigned to a particular resource and to transmit the location or route identification number to the control hub 110. The control hub 110 can then identify which route generated by the dynamic router 130 is closest to or is assigned to the particular resource, and transmit the corresponding route information. The mobile delivery device 140 is configured to receive the route information from the control hub 110, and display the route information to the resource. In some embodiments, the mobile delivery device 140 may be configured to receive additional item specific information sent by the control hub 110, such as payment information, specific pickup or delivery instructions, such as where to leave a package, or other desired item specific information. In some embodiments, the mobile delivery device 140 is configured to receive an input of a route identification number. The mobile delivery device 140 can request the route instructions associated with the route identification number from the control hub 110 and/or the dynamic router 130.

In some embodiments, a user may inquire about the status of a pick-up or delivery, and request real-time information via the user interface 120. In some embodiments, the user interface 120 may comprise a network access point, such as, for example, a dedicated computer or terminal at a vendor, merchant, or retail location. In some embodiments, the user interface 120 may be accessible to a customer, merchant, retailer, vendor, or purchasing party via the internet using an internet enabled computer, or using a tablet computer, smartphone, using a specific application, or via any other wired or wireless means. In an exemplary embodiment, the user accesses the user interface 120 via a website over an internet connection. For example, the user interface 120 is configured to request and accept a user login. The user login may be established for a customer at the time of purchase, or the user may register with the system 100, and use the same login credentials for all of the user's purchases, pick-ups, and/or deliveries. The user login information may be stored at control hub 110, or may be stored in a memory, for example, in a database accessible by the control hub 110. When a user requests a login via the user interface 120, the user interface 120 is configured to query the control hub 110 to identify the user as a customer or registered user, and is configured to provide the user with options for tracking items associated with that user.

In some embodiments, the user may request to track the status of a particular item. The user interface 120 is configured to query the control hub 110 in response to user requests. The control hub 110 is configured to provide a response to the user request. If the user requests real time tracking information of a user's item or of the resource, the control hub 110 may query the mobile delivery device 140 for up-to-date, real-time tracking information. The control hub 110 may access the stored GPS coordinates. The control hub 110 may then provide the location of the item or the resource. The control hub 110 may compare the route received from the dynamic router 130 and compare it to the location of the resource received from the mobile delivery device 140. Based on this information, the control hub 110 can estimate the time of delivery of the user's item, and provide an estimated delivery time to the user.

For example, the user may request the pick-up or delivery status of an item. If the item has been picked up or delivered, the control hub 110 is configured to provide notice of the pick-up and/or delivery and the confirmation number associated with the pick-up and/or delivery. If the item has not been picked-up or delivered yet, the control hub 110 may query the mobile delivery device 140 in use by the resource assigned to pick-up or deliver a specific item or group of items and request the location or coordinates of the mobile delivery device 140, and thus, the location of the resource picking up or delivering the item(s). In response, the mobile delivery device 140 may respond to the query, and provide the location or coordinates of the mobile delivery device 140. The control hub 110, then communicates the location of the mobile delivery device 140 and the resource to the user interface 120, which can display the location of the resource on a map for the user. The control hub 110 may not provide to a user the specific location of the resource due to privacy or safety concerns. In this instance, the control hub 110 can provide an approximate or generalized location, such as, "the resource is on your block," or "the resource is 0.8 miles from your location." The control hub 110 can also provide only an estimated time of delivery or pick-up without providing location information.

In some embodiments, the control hub 110 may provide the GPS location and the routing instructions of the user's item vis-à-vis the other items. For example, if the user's item has not yet been picked up, the control hub 110 may communicate to the user interface 120 that the user's item is, for example, the fourth item scheduled for pick-up and/or delivery, or that there are two remaining pick-ups or deliveries prior to the pick-up and/or delivery of the user's item. In some embodiments, the control hub 110 may provide an estimated time of delivery to the user interface 120, based on the GPS coordinates of the mobile delivery device 140, and the routing instructions corresponding to the user's item. The user interface 120 may then display the location and a pick-up or delivery estimate to the user.

In some embodiments, the user may be an agent or other management or supervisory personnel. In these embodiments, the agent or supervisor logs in, and the system 100 is configured to authenticate the login identification as described above. More specifically, the agent or supervisor logs in to the user interface 120 and is presented with supervisory options according to the agent or supervisor's permissions and responsibilities. The user interface 120 for an agent or supervisor may be configured to provide access to the pick-up and/or delivery status and GPS location of all the resources assigned to a particular geographic area or area of responsibility. The agent or supervisory user interface 120 may also be configured to allow the agent or supervisor to communicate, via the control hub 110, with the individual resources to provide further instructions, to address problems, or for any other desired reason. This communication may be via e-mail, text messages, video, audio, or any other desired means. In some embodiments, the user interface 120 may be configured to provide the agent or supervisor with a graphical display pinpointing the location of all available resources on a map, and provide real-time movement information as the resources follow the routing instructions.

In some embodiments, the control hub 110 is configured automatically to monitor the movements and pick-up and delivery status of each item, and to provide automated communication to individual resources regarding changes in routing instructions, developing problems, such as traffic, road construction, etc., changes in pick-up and/or delivery schedules, cancellations, and for any other desired reason. These communications may be generated by the control hub 110 and relayed to the individual resources via the handheld devices 140 via the communication feature 117. The communication may be an email, SMS text, voice message, graphical alert on the mobile delivery device 140, or any other desired communication method.

As depicted in FIG. 1, the control hub 110 is in communication with the payment module 150. In some embodiments, upon receiving item information from the user interface 120, the control hub may query the payment module 150 to inquire, for each item whose item information the control hub receives, whether a fee, payment, such as postage, has been paid, or whether a fee is required. In some embodiments, the control hub 110 is configured to provide, to the dynamic router 130, the item information for only those items whose postage or fees have been paid, or for which there is no fee or postage required. In some embodiments, the payment module 150 may communicate to the control hub that the fee or postage for a particular item is to be collected at time of delivery. The control hub 110 may store this information for subsequent transmission to the handheld device along with the route information corresponding to the location or identity of the resource.

The resource interface 160 is in communication with the control hub 110. In some embodiments, the resource interface 160 is configured to receive information from subsystems and information sources for the distribution network. The resource interface 160 can be connected to various systems to receive resource information. The resource information can include, for example, carrier identifiers, vehicle identifiers, GPS breadcrumb data from mobile delivery devices, weather information in the geographic areas of pick-up and delivery locations, traffic information in the geographic areas of pick-up and delivery locations and between the locations, vehicle inventory information, assigned carrier routes, carrier loads and timing requirements for existing carrier deliveries, and any other desired information useful in determining an optimal or efficient dynamic route for picking up and delivering an item.

Figure 2:
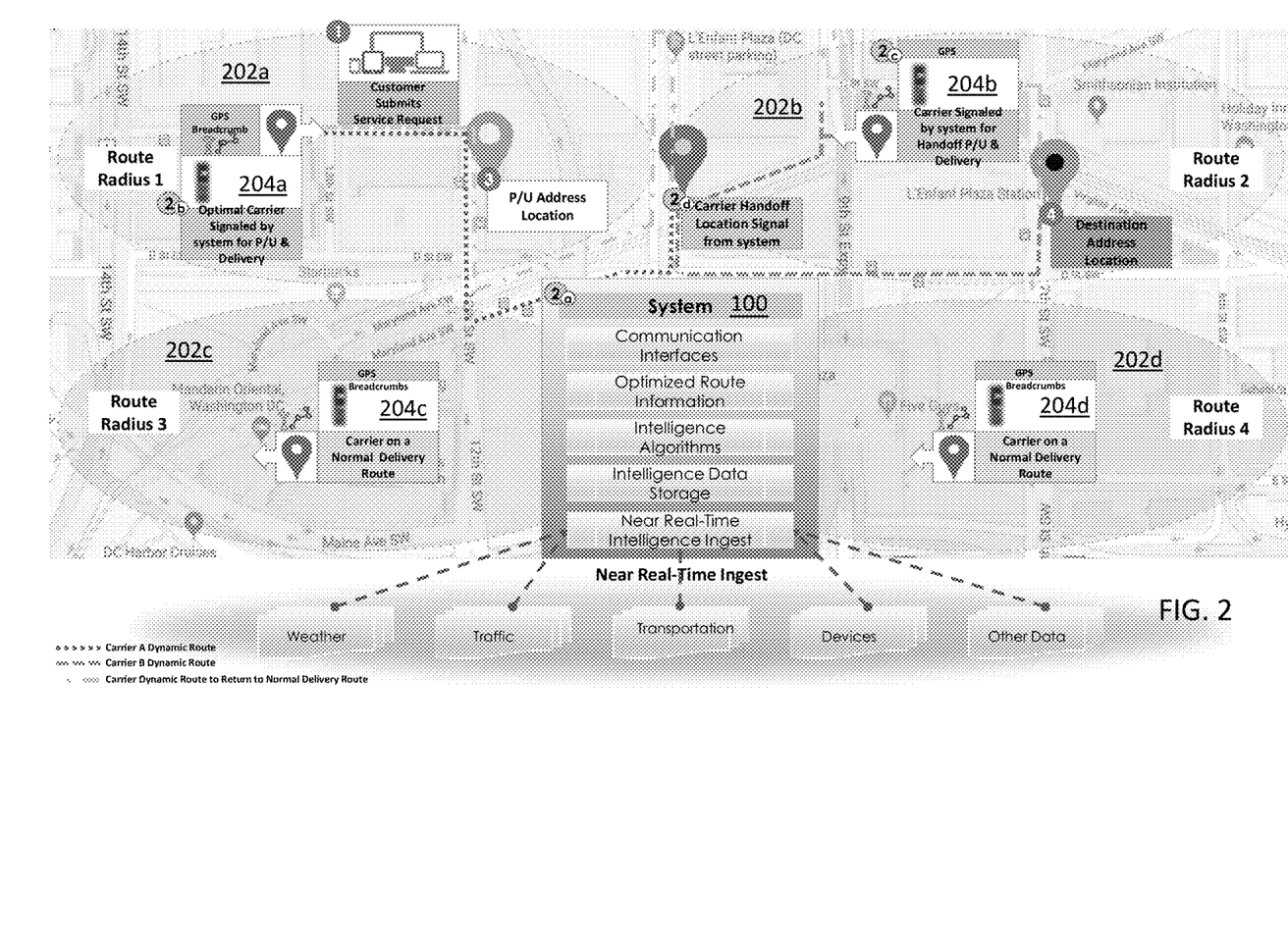
FIG. 2 depicts an exemplary map of dynamic pick-up and delivery routing.

FIG. 2 shows an exemplary map on which a dynamic route is created for pick-up and delivery of an item, in association with a control system such as the system 100 of FIG. 1. The map of FIG. 2 shows a geographic area having 4 carrier regions 202a, 202b, 202c, and 202d (collectively referred to herein as 202a-d). Each carrier region 202a-d is typically serviced by a single carrier, or encompasses a region having one carrier route therein. In some embodiments, the carrier regions 202a-d are dynamically drawn around carriers within a geographic area when a request for an item pick-up, item delivery, or other service request is received.

As depicted, one carrier 204a, 204b, 204c, or 204d (collectively referred to herein as 204a-d) is delivering items along planned routes within each of the carrier regions 202a-d. For example, a carrier 204a delivers items along a planned route within carrier region 202a, etc. As the carriers 204a-d are delivering along their planned routes, at (1), a request (e.g., an item order, a request for pick-up and delivery, etc.) is received by the system 100. For example, the request may be received at the control hub 110 of the system 100 from a user interface 120.

At (2a) the system 100 receives the item pick-up location, desired delivery location, timing requirements, and resource information, and develops dynamic routes for delivering the item. For example, the item pick-up location, desired delivery location, timing requirements, and resource information may be received at the control hub 110. At least some of the received information may be sent from the control hub 110 to the dynamic router 130 for dynamic route development. The pickup location (3) is determined to be within carrier region 202a. The delivery location (4) is determined to be within carrier region 202b. The dynamic router 130 accordingly identifies a transfer point (2d) for carrier 204a to give the item to carrier 202b.

Carrier 204a is identified as the optimal carrier to pick up the item based on the pick-up location (3) and based on the resource information received from the resource interface 160. Carrier 204b is identified as the optimal carrier to deliver the item based on the delivery location (4) and based on the resource information received from the resource interface 160. In some embodiments, the optimal carriers are determined based on a delivery time and delivery location preference, carrier load, position along carrier route, and the like. If a carrier is the closest to a delivery point, but has just begun a route, or is already delivering time sensitive items, or has no excess capacity to load or carry the item, the system 100 may not identify that carrier as the optimal carrier for delivery of the item. The system 100 may determine what the position, status, inventory, etc., of the next closest carrier is, and based on timing requirements, may identify the next closest carrier as the optimal carrier for the delivery. The same or similar analysis may be performed for the optimal pick-up carrier.

In some embodiments, the optimal carrier may not be the closest physically to the pick-up or delivery location because of heavy traffic along a route or in an area, due to bad weather, etc. In such a case, the dynamic router 130 may determine that another carrier who may be less impacted by traffic problems or weather issues is the optimal carrier for either pick-up or delivery. In some embodiments, the dynamic router 130 may utilize known and/or real-time traffic information, weather information, or the like in determining the optimal carrier for pick-up or delivery.

After the system 100 determines optimal carriers for pick-up and delivery, the system 100 sends instructions to carrier 204a. The instructions include a notification of the dynamic pick-up, and can include location information identifying the pick-up location (e.g., an address, intersection, GPS coordinates, or the like), directions to the pick-up location, location information identifying a point along the route of carrier 204a at which carrier 204a will deviate from his route to reach the pickup location (3), item information, etc. At (2b) the carrier 204a departs from his planned route and moves to the pick-up location (3). The carrier 204a picks up the item at the pick-up location (3) and may return to his planned route after picking up the item.

The system 100 also sends instructions to carrier 204b to deviate from his route, and to move toward the transfer point (2d). The system 100 can determine an estimate of how long it will take carrier 204a to pick-up the item and move to the transfer point (2d), and how long it will take carrier 204b to move to the transfer point (2d), e.g., based on an expected travel distance, a predetermined expected walking speed, historical data regarding a walking speed of the carrier 204a, etc. Thus, the system 100 can coordinate the timing of instructions to the carriers 204a and 204b so their arrival at the transfer point (2d) occurs at the same time or nearly the same time (e.g., within 30 seconds, within one minute, within three minutes, within five minutes, etc.). At the transfer point (2d), carrier 204a and carrier 204b meet and carrier 204a transfers the item to carrier 204b.

After carrier 204a transfers the item to carrier 204b, the carrier 204a receives, via the mobile delivery device, instructions on returning to his planned route. The instructions to return to the regular route can be part of the dynamic route determined by the system 100. For example, in some embodiments the instructions to return to the regular route may include a location at which the carrier 204a is to resume his planned route, step by step directions for returning to the location, etc. In some embodiments, the carrier 204a may be directed to return to the same point at which the carrier 204a left the planned route to travel to the transfer point (2d), or the carrier 204a may be directed to travel to a different point farther along the planned route relative to the point at which the carrier 204a left the planned route (e.g., if the carrier 204a was not carrying any other items to be delivered at locations between the point of departure and the point of resumption of the route).

In some embodiments, the transfer point (2d) may be selected from a plurality of predetermined transfer nodes. A transfer node can be a geographic location or point where an item can be picked up, deposited, or transferred from one resource to another resource. As described with reference to FIG. 1, the dynamic router 130 may be configured to identify, store, modify, delete, or otherwise manage a list or database of predetermined transfer nodes. When a pickup/delivery request is subsequently received that can be fulfilled using a plurality of routes as described above, the dynamic routing performed by the dynamic router 130 can include the selection of one of the predetermined transfer nodes as a location for two resources (e.g., a pickup resource, a delivery resource, and/or an intermediate resource) to meet and transfer the item.

Transfer nodes may be identified based on one or more of a variety of selection factors. Identified transfer nodes can be stored and accessed by the dynamic router 130 and with additional components of the system 100. In some embodiments, potential transfer nodes may be identified based on their proximity to a plurality of resource routes (e.g., carrier routes). For example, potential transfer nodes may include intersections, pedestrian-friendly areas, parks, plazas, etc., located along portions of existing resource routes that are in relatively close proximity to one or more other nearby resource routes (e.g., within a threshold distance such as within 0.25 miles, within 10 blocks, within a distance corresponding to a walk time of 1 minutes, 2 minutes, 5 minutes, 10 minutes, etc.). In another example, potential transfer nodes may include locations that are not located directly along a resource route but are disposed within a similar threshold distance of two or more resource routes. Accordingly, the transfer node locations are selected such that resources traveling along two different resource routes can stop along their routes and/or briefly deviate from their respective routes to meet at a node to transfer one or more items.

Various additional selection factors may be considered at the dynamic router 130 to select transfer nodes from among the potential node locations. In some embodiments, at least some transfer nodes may be selected based on historical location data associated with resources. In one example, GPS location data received from mobile delivery devices carried by resources may indicate that resources frequently spend at least a threshold time (e.g., at least 30 seconds, at least one minute, at least two minutes, at least five minutes, etc.) at some potential node locations (e.g., a location of an item storage or retrieval box, a location where resources frequently park their vehicles during "park and loop" operations, etc.). In some embodiments, the selection of such locations may advantageously allow for two resources to meet and transfer items without undesirably delaying one or both resources. Moreover, if a transfer node is a frequent vehicle parking location, a transfer may be effected by instructing one resource to drop off an item in a parked vehicle or retrieve an item from a parked vehicle while the resource associated with the vehicle is not present, further reducing the additional time required for one or both resources during a transfer.

In some embodiments, the dynamic router 130 may determine that some potential node locations should not be used as transfer nodes. For example, an intersection may not be selected as a transfer node if one or more roads at the intersection do not have sidewalks or are frequently highly congested. In another example, some outdoor locations may not be used as transfer nodes during adverse weather conditions if the locations are known to lack shelter structures. In yet another example, existing transfer nodes may be removed (e.g., deleted from a database, etc.) based on one or more adverse reports from resources traveling to or from the transfer nodes (e.g., adverse reports related to safety, crime, travel delays, etc.). Accordingly, by selecting and optimizing the set of transfer nodes utilized by the dynamic router 130, item transfers between resources may be achieved with minimal impact to the resources' safety or the timeliness of the deliveries along the resources' regularly planned routes.

Figure 3:
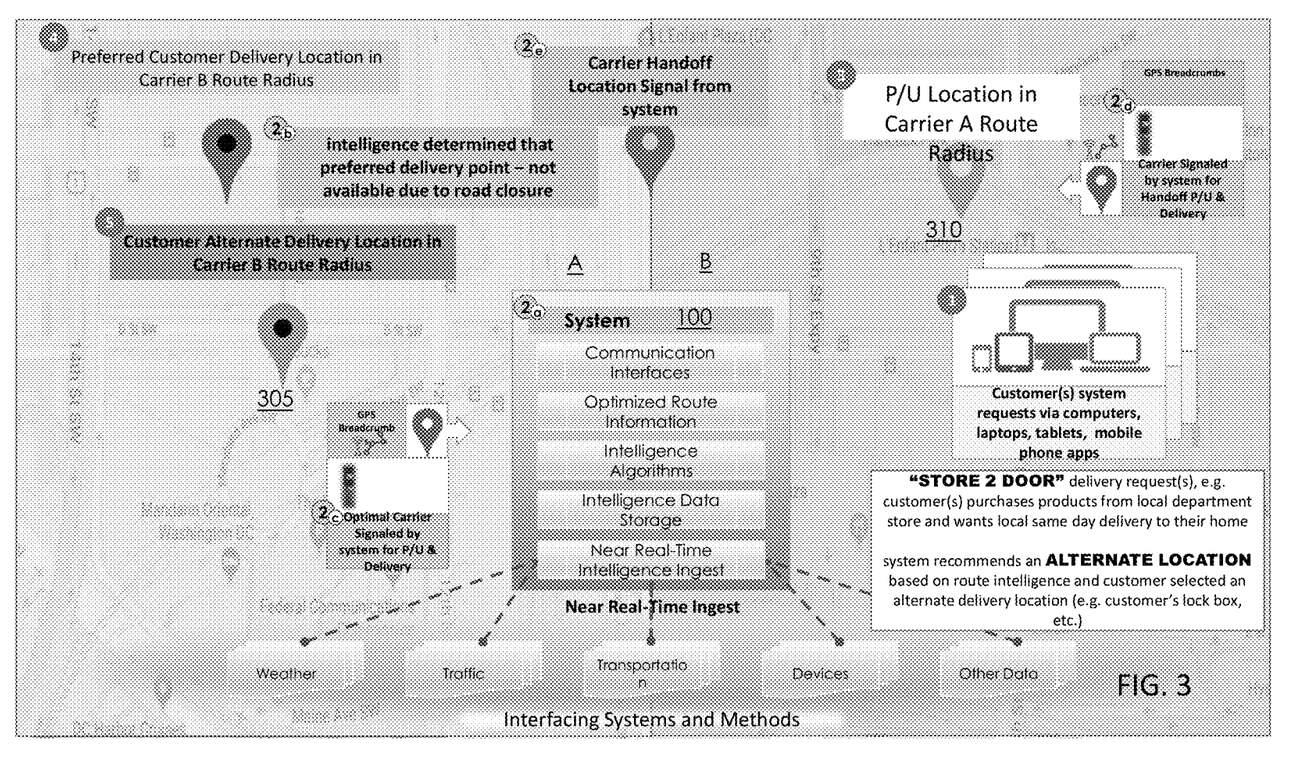
FIG. 3 shows an exemplary map on which a dynamic route is created for pick-up and delivery of an item using an alternate delivery location.

FIG. 3 shows an exemplary map on which a dynamic route is created for pick-up and delivery of an item using an alternate delivery location. The process for a customer ordering an item, requesting a pick-up and/or delivery, or requesting a service can be similar to that described elsewhere herein.

FIG. 3 depicts 2 carrier areas, area A comprising the left half of FIG. 3 and area B comprising the right half of FIG. 3. The pick-up location 305 is located in carrier area A. The customer requested delivery to a delivery point 310 within the carrier area B. At (2b) the system 100 determines that the customer's preferred delivery point 310 is unavailable, for example, because it is inaccessible, is too inefficient based on existing routes and/or resource locations, or for another reason. The system 100 determines the location of a customer's alternate delivery locations, which may have been input with the item order, or which the distribution network may have associated with the user and the user's account. In some embodiments, the system 100 may determine where the nearest secure delivery facility, such as an electronic parcel locker, is located, and set that location as a delivery point. In some embodiments, the system 100 requests the user select one of the proposed delivery locations, and sets the selected delivery location for delivery. The system then notifies the carriers according regarding pick-up and delivery, and the carriers are directed to the pick-up location, transfer point, and delivery location.

The alternate delivery location may be a location that optimizes or improves efficiency of delivery based on the systems and methods described herein. In some embodiments, the alternate delivery location may be a node located near the user's preferred delivery point 310. For example, the system may determine that there is not a suitable combination of planned resource routes and/or resource locations that will allow the item to be delivered to the user's preferred delivery point 310 (in one particular example, the item can be delivered to a node near the preferred delivery point 310, but the resource on the planned route from the node to the preferred delivery point 310 may have already passed the node). In this case, a node near the preferred delivery point 310 may be used instead, for example, if the node includes a secure receptacle, an electronic parcel locker, a distribution network facility, or other location where the resource can leave the item for the user. In another example, a non-node location (e.g., a secure receptacle or an electronic parcel locker located relatively near the preferred delivery point 310 along a different resource route that does not pass the preferred delivery point 310) may be used as the alternate delivery location. In further embodiments, an alternate delivery location may be used even if the user's preferred delivery point 310 is available, for example, if it would be substantially more efficient for the distribution network to do so (e.g., if delivery to the preferred delivery point 310 would require 15 minutes of resource waiting time while delivery to a suitable alternate delivery location would require only 5 minutes of resource waiting time).

Figure 4:
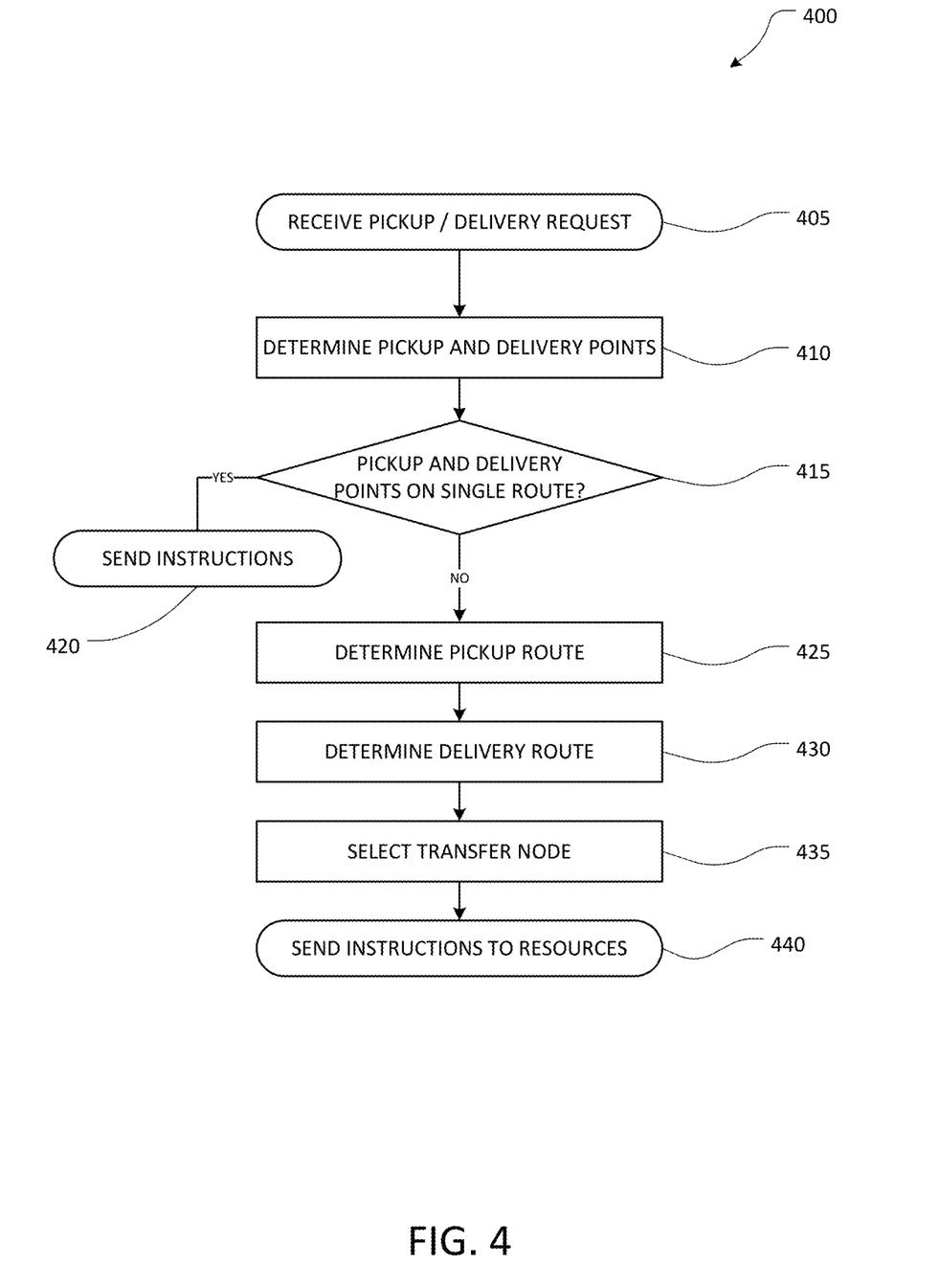
FIG. 4 is a flowchart depicting an exemplary method of dynamically routing delivery resources.

FIG. 4 is a flowchart depicting an exemplary method 400 of dynamically routing delivery resources. The method 400 may be implemented within a variety of distribution networks or systems, such as the system 100 of FIG. 1. In some embodiments, the method 400 may be performed at least in part by the central hub 110 in conjunction with the dynamic router 130, a user interface 120, and/or one or more mobile delivery devices 140.

The method 400 begins at block 405 when a pickup/delivery request is received. The request may be received at the central hub 110 via the user interface 120. The request may include a pickup location where an item is to be picked up, a delivery location where the item is to be delivered, and item information associated with the item. The pickup and delivery locations may include, for example, addresses or other location information identifying the pickup and delivery locations. The item information may include, for example, an alphanumeric identifier corresponding to the item, an image of the item, dimensions and/or weight of the item, payment information corresponding to the item, etc. When the pickup/delivery request has been received the method 400 continues to block 410.

At block 410, the system 100 determines pickup and delivery points for the item. In some embodiments, the pickup and delivery points may be the same as the pickup and delivery locations received with the request at block 405. In some embodiments, a known delivery point near the received delivery location (e.g., a secure receptacle, a nearby street address, etc.) may be substituted for the received delivery location if the received delivery location is not available as a delivery point. In addition, the system 100 may determine location information corresponding to the pickup and delivery points, such as latitude and longitude for each point, in order to facilitate dynamic routing of the item. When the pickup and delivery points for the item have been determined, the method 400 continues to decision state 415.

At decision state 415, the system 100 determines whether the pickup and delivery points are located along a single resource route (e.g., a planned route to be traveled by a delivery resource within the distribution network). If the pickup and delivery points can be accommodated by a single resource along a planned route, the method 400 terminates at block 420. No dynamic routing is necessary, and the central hub 110 sends instructions to a mobile delivery device 140 carried by a resource along the identified route instructing the resource to pickup the item at the pickup point and to deliver the item at the delivery point. If it is determined at block 415 that the pickup and delivery points are not along a single route, the method 400 continues to block 425 to dynamically determine a route for the item.

At block 425, the dynamic router 130 determines a pickup route. The pickup route may be determined, for example, by identifying one or more planned resource routes that pass through or near the determined pickup point. In some embodiments, the dynamic router 130 selects a planned resource route that passes within a threshold distance of the pickup point, for example, within 0.5 miles, within 0.25 miles, within 0.1 miles, within a predetermined number of city blocks of the pickup point, or within a distance corresponding to a maximum allowable deviation time (e.g., within a five-minute walk off the planned resource route). In some embodiments, the dynamic router 130 may consider additional factors in determining the pickup route. For example, the dynamic router 130 may use real time or near-real time resource location information and may only consider routes in which the resource serving the route has not yet passed the pickup point. After the pickup route is determined, the method 400 continues to block 430.

At block 430, the dynamic router 130 determines a delivery route. The delivery route may be determined, for example, by identifying one or more planned resource routes that pass through or near the determined delivery point. In some embodiments, the dynamic router 130 selects a planned resource route that passes within a threshold distance of the delivery point, for example, within 0.5 miles, within 0.25 miles, within 0.1 miles, within a predetermined number of city blocks of the delivery point, or within a distance corresponding to a maximum allowable deviation time (e.g., within a five-minute walk off the planned resource route). In some embodiments, the dynamic router 130 may consider additional factors in determining the delivery route. For example, the dynamic router 130 may use real time or near-real time resource location information and may only consider routes in which the resource serving the route has not yet passed the delivery point and/or routes in which the resource serving the route has not yet passed a portion of the route that is located near the pickup route. After the delivery route is determined, the method 400 continues to block 435.

At block 435, the dynamic router 130 selects a transfer node between the pickup route and the delivery route. The dynamic router 130 may select the transfer node from a plurality of stored transfer nodes, which may be stored in association with one or more resource routes. The dynamic router 130 may select a transfer node that is within a threshold distance of both the pickup route and the delivery route. Similar to the selection criteria for the pickup and delivery routes, the dynamic router 130 may select a transfer node that is within a desired maximum deviation distance or time for each resource. In some embodiments, the selected transfer node may be located on either the pickup route or the delivery route, or may be located away from both routes such that both resources will make a small deviation from their planned routes to transfer the item. The selection of the transfer node may further be based on real time or near-real time resource location information. For example, the dynamic router 130 may identify a first node that is a 5-minute walk from the pickup resource's current location and a 25-minute walk from the delivery resource's current location, and a second node that is a 17-minute walk from the pickup resource's current location and a 13-minute walk from the delivery resource's current location. In this situation, the dynamic router 130 may select the second node as the transfer node because an item transfer at the second node will only require the delivery resource to wait for approximately 4 minutes for the arrival of the pickup resource at the second node, while an item transfer at the first node would require the pickup resource to wait 20 minutes for at the first node. Accordingly, selection of the second node as the transfer node may reduce waiting time and optimize the efficiency of the dynamic routing system.

The dynamic router 130 may additionally determine amendments to one or more of the pickup route and the delivery route. For example, the amendment to the delivery route may include a location at which the resource is to deviate from the planned resource route, a route from the deviation point to the pickup point, and a route from the pickup point to a location at which the resource is to rejoin the planned resource route. The amendment may further include a second location at which the resource is to deviate from the planned resource route, a route from the second deviation point to the transfer node, and a route from the transfer node to a point at which the resource is to again rejoin the planned resource route. When the transfer node has been selected and any amendments have been determined and sent to the central hub 110, the method 400 continues to block 440.

At block 440, the method terminates as the central hub 110 sends instructions to the resources. The central hub 110 may transmit instructions to mobile delivery devices 140 carried by the resources on the pickup and delivery routes, causing the mobile delivery devices 140 to display instructions to the resources. The displayed instructions may include location identifiers indicating locations such as the pickup point, the delivery point, or the item transfer node, and/or turn-by-turn directions directing the resources to the identified points. In some embodiments, the instructions provided to each resource further include information identifying the other resource to be met at the transfer node (e.g., a name or other identifying characteristic to permit the two resources to identify one another. In some embodiments, the mobile delivery devices 140 may further provide an alert such as a visual or audio alert, to notify each resource that there has been a change to the planned resource route.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development.

What is claimed is:

1. A system for an autonomous vehicle, the system comprising:
    a processor configured to receive item delivery requests, each item delivery request comprising a pickup location, a delivery location, and item information corresponding to an item to be delivered;
    a dynamic router processor in communication with a memory storing a plurality of predetermined resource routes traveled by a plurality of resources, the dynamic router processor configured to:
    identify a plurality of potential nodes each located within a predetermined threshold distance of at least two of the plurality of predetermined resource routes;
    store, in the memory, at least a subset of the identified plurality of potential nodes as transfer nodes for subsequent item delivery requests;
    remove individual transfer nodes of the plurality of stored transfer nodes based at least in part on one or more adverse reports received from resources traveling to or from the individual transfer nodes, the one or more adverse reports corresponding to safety conditions of individual transfer nodes; and
    for individual item delivery requests:
        determine, from the plurality of predetermined resource routes, a first resource route, associated with a non-autonomous first resource, that passes within a first threshold distance relative to the pickup location;
        determine, from the plurality of predetermined resource routes, a second resource route, associated with a second resource comprising an autonomous vehicle, that passes within the first threshold distance relative to the delivery location;
        select, from the plurality of stored transfer nodes, a transfer node disposed within a second threshold distance relative to at least a portion of the first resource route and at least a portion of the second resource route; and
        send dynamic route information to the processor, the dynamic route information identifying at least the first resource route, the second resource route, and the transfer node;
    wherein the processor is further configured to:
        cause a display of a mobile device to display an item pickup instruction and a first item transfer instruction to the non-autonomous first resource located along the first resource route; and
        control the autonomous vehicle, based on a second item transfer instruction and an item delivery instruction electronically transmitted to the autonomous vehicle located along the second resource route, such that the autonomous vehicle is caused to receive the item from the first resource and to deliver the item to the delivery location.

2. The system of claim 1, wherein the dynamic router processor is further configured to receive real time or near-real time location information corresponding to individual resources located along the predetermined resource routes.

3. The system of claim 2, wherein the dynamic router processor selects the transfer node based at least in part on determining, based on the location information, that the second resource has not yet passed the portion of the second resource route.

4. The system of claim 1, wherein the first item transfer instruction and the second item transfer instruction each include at least one of an identifier of the selected transfer node or directions to the selected transfer node.

5. The system of claim 1, wherein the one or more item pickup instructions comprise at least one of an identifier of the pickup location or directions to the pickup location.

6. The system of claim 1, wherein the item delivery instructions comprise at least one of an identifier of the delivery location or directions to the delivery location.

7. The system of claim 1, wherein at least one of the first item transfer instruction or the second item transfer instruction comprises an instruction to deviate from and subsequently return to the first resource route or the second resource route.

8. The system of claim 1, wherein the dynamic router processor deletes the removed individual transfer nodes from the memory such that the removed individual transfer nodes are prevented from being selected as the transfer node for a subsequent item delivery request.

9. The system of claim 1, wherein the processor is further configured to:
    cause the mobile device to provide, to the first resource, a visual or audio alert when the item pickup instruction is displayed.

10. The system of claim 1, wherein the first item transfer instruction comprises identification information associated with the second resource, and wherein the second item transfer instruction comprises identification information associated with the first resource.

11. The system of claim 1, wherein the dynamic router processor is further configured to select ones of the plurality of potential nodes having pedestrian infrastructure for inclusion in the subset.

12. A method for an autonomous vehicle, the method comprising:
- identifying, by a dynamic router processor of a distribution network, a plurality of potential nodes each located within a predetermined threshold distance of at least two of a plurality of predetermined resource routes;
- storing, in a memory, at least a subset of the identified plurality of potential nodes as transfer nodes for subsequent item delivery requests;
- removing individual transfer nodes of the plurality of stored transfer nodes, based at least in part on one or more adverse reports received from resources traveling to or from the individual transfer nodes, the one or more adverse reports corresponding to safety conditions of individual transfer nodes;
- receiving, at a computing resource of the distribution network, a request for delivery of an item from a pickup location to a delivery location;
- determining, from the plurality of predetermined resource routes, a first resource route, associated with a non-autonomous first resource, that passes within a first threshold distance relative to the pickup location;
- determining, from the plurality of predetermined resource routes, a second resource route, associated with a second resource comprising an autonomous vehicle, that passes within the first threshold distance relative to the delivery location;
- selecting, from the plurality of stored transfer nodes, a transfer node located such that the first resource route and the second resource route each pass within a second threshold distance relative to the selected transfer node;
- causing a display of a mobile device to display an item pickup instruction and a first item transfer instruction to the non-autonomous first resource located along the first resource route; and
- controlling the autonomous vehicle, based on a second item transfer instruction and an item delivery instruction electronically transmitted to the autonomous vehicle located along the second resource route, such that the autonomous vehicle is caused to receive the item from the first resource and to deliver the item to the delivery location.

13. The method of claim 12, wherein the request comprises item information identifying the item, and wherein the first set of instructions comprises the item information.

14. The method of claim 12, wherein the transfer node is selected based at least in part on real time or near-real time location information corresponding to the first resource and the second resource.

15. The method of claim 14, wherein the transfer node is selected based at least in part on determining, based on the location information, that the second resource has not yet passed a portion of the second resource route proximate the transfer node.

16. The method of claim 14, wherein the transfer node is selected based at least in part on a temporary parking location of a vehicle associated with the first resource or the second resource.

17. The method of claim 16, wherein the first set of instructions comprises an instruction to deposit the item within the vehicle, or wherein the second set of instructions comprises an instruction to retrieve the item from the vehicle.

18. The method of claim 12, wherein at least one of the first set of instructions or the second set of instructions comprises an instruction to deviate from and return to the first resource route or the second resource route.

19. The method of claim 12, further comprising:
- receiving a subsequent request for delivery of a second item from a second pickup location to a second delivery location within a requested time period;
- determining that the delivery of the second item cannot be performed within the requested time period, based at least in part on the second pickup location, the second delivery location, and real time or near-real time location information corresponding to one or more resources; and
- sending, to a user interface associated with the subsequent request, a notification that the delivery of the second item cannot be performed within the requested time period.

20. The method of claim 12, wherein storing the at least a subset of the identified plurality of potential nodes comprises selecting ones of the potential nodes having pedestrian infrastructure for inclusion in the subset.

* * * * *